United States Patent [19]

Johnston

[11] 3,731,072

[45] May 1, 1973

[54] SIGNAL PROCESSING CIRCUITS

[75] Inventor: James Stewart Johnston, Sussex, England

[73] Assignee: Rosemount Engineering Company, Limited, Bagnor Regis, Sussex, England

[22] Filed: July 22, 1971

[21] Appl. No.: 165,198

[30] Foreign Application Priority Data

Sept. 22, 1970 Great Britain....................45,143/70

[52] U.S. Cl.............235/151.3, 340/347 AD, 73/344

[51] Int. Cl.............................................H03k 13/02

[58] Field of Search......................235/151.3, 151.34, 235/194; 340/347 NT, 347 AD; 73/344, 357

[56] References Cited

UNITED STATES PATENTS 3,517,339 6/1970 Hubbard et al. ...............340/347 NT 3,578,955 5/1971 Kloven ...........................340/347 NT 2,941,196 6/1960 Raynsford et al. .............340/347 NT

*Primary Examiner*—Eugene G. Botz

*Assistant Examiner*—James F. Gottman

*Attorney*—Ralph L. Dugger et al.

[57] ABSTRACT

A signal processing circuit comprises a difference amplifier receiving an input signal and a feedback signal. A bistable circuit switches repeatedly between states only when the difference amplifier's output is non-zero and positive. The feedback signal is developed by a switch that is closed to apply to an integrator a reference signal in response to pulses from the output of the bistable circuit. A source providing a pulse train clocks the bistable circuit. A heat meter in which the input signal comes from a temperature sensitive bridge and the pulse train comes from a flow meter is described.

16 Claims, 6 Drawing Figures

SIGNAL PROCESSING CIRCUITS

This invention relates to signal processing circuits. In its simplest form it is concerned with a circuit for converting an input signal such as a voltage into a corresponding pulse output.

According to the invention a signal processing circuit comprises means responsive to an input signal and a feedback signal to produce a first signal varying in accord with the difference between the input and feedback signals, a pulse source providing a continuous train of pulses, a bistable device having set, reset and pulse input lines and which can be changed in state by set and reset signals only in response to a pulse on said pulse input line, means applying said continuous train of pulses to said pulse input line, means applying a logic reset signal to said reset input line, means applying said first signal to said set input line whereby the bistable device changes in state repetitively to produce a repetitive pulse output signal with a frequency proportional to the continuous train of pulses when the first signal is in a predetermined condition (such as non-zero and positive), and means coupled to said bistable device for developing the feedback signal in accord with the average frequency of the pulse train.

By providing an output pulse signal when the first signal is in a predetermined condition, but not otherwise, it is found that the average output pulse frequency is proportional to the magnitude of the input signal. The invention accordingly provides a convenient way of converting an input signal, normally a direct signal, into a corresponding frequency.

The means for developing the feedback signal may comprise integrating means such as a passive integrator which may comprise a series resistor and a shunt capacitor. The integrating means may be arranged to receive the pulses constituting the pulse output signal. Alternatively however it may be arranged to receive pulses temporally corresponding to the pulses in the output signal. For this purpose the means for developing the feedback signal may comprise integrating means as aforesaid and switch means for applying a reference signal to the integrating means at times temporally corresponding to the pulses of the pulse output signal. This arrangement provides a convenient means for altering the ratio between the input signal and the frequency of the pulse output signal. Means may be provided for varying the reference signal and thereby raising or lowering the pulse output frequency for an input signal of given magnitude.

The switch means may comprise an electronic switch which may be temporally closed to apply the reference signal to the integrating means in response to each pulse of the said pulse output signal.

The means responsive to the first signal may include a difference amplifier. The difference amplifier would normally be arranged to form the said first signal in accord with the difference between the input signal and the feedback signal. It would be possible to add a reference signal to either the input direct signal or the feedback signal. The input signal would normally be a direct signal: the amplifier may be a direct current amplifier but could be a chopper amplifier operated at a frequency corresponding to the pulses of the input pulse train. This would avoid the necessity to use a separate pulse generating means for operating the pulse amplifier. Alternatively the difference amplifier may be an alternating current amplifier and switching means may be provided for interrupting the feeding of the input direct signal and the feedback signal to respective inputs of the alternating current amplifier. The switching means may comprise a switch or switches operable by pulses from a pulse source arranged to provide the pulses of the said pulse train.

The means responsive to the said first signal may comprise a logic circuit adapted to respond to an input pulse train to produce the repetitive pulse output signal with a frequency proportional to the repetition frequency of the pulse train when the first signal is in the predetermined condition. The logic circuit preferably includes a bistable device which can be changed in state only in response to a pulse in the pulse train and which is adapted to switch repeatedly between states only if the said first signal is in the predetermined condition. The pulse output signal can be provided by the bistable device.

It is readily possible to show that the pulse output frequency is proportional not only to the said input signal but is proportional to the product of the frequency of the input pulse train and the magnitude of the input signal. Accordingly it is possible to provide a multiplier of two variables represented by an input pulse train and a direct electrical signal. Such a multiplier would include means for providing an input pulse train of variable frequency. One particular although not exclusive use of such a multiplier would be in a heat-flow meter in which it is usually convenient to provide, for example by means of two temperature sensors in a bridge circuit, a voltage proportional to the difference in temperature of two parts of a heat-flow system. It is also convenient to provide a pulse train, derived from the operation of a turbine responsive to a fluid flow, a pulse train having a repetition frequency proportional to the rate at which a fluid flows. The rate of heat-flow from or to the fluid is represented by the product of the temperature difference and the rate at which the fluid flows.

Accordingly the invention includes within its scope a meter comprising means responsive to a first variable to feed to a circuit as described above an input signal of magnitude proportional to the first variable, means responsive to a second variable for producing a pulse train of repetition frequency proportional to the second variable and feeding the said pulse train to the said circuit, and indicating means responsive to the pulse output. The means responsive to the first variable may include a temperature measuring bridge and the means responsive to the second variable may include a turbine or equivalent device responsive to the rate of flow of a fluid. Very conveniently a counter is arranged for counting the pulse output so that if the input signal and the input pulse train are proportional to, for example, a temperature difference between two points in a stream of fluid and the rate of flow of that fluid the counter can indicate the total heat transferred to or from the fluid after the start of a count.

Several embodiments of the invention will now be described with reference to the accompanying drawings, in which:

FIG. 1 illustrates a circuit which is suitable for converting an input voltage $V_t$ into a pulse output suitable for transmission. The circuit of FIG. 1 forms part of the system shown in the other Figures and accordingly will be described in detail only with reference to FIG. 1.

Figure 1:
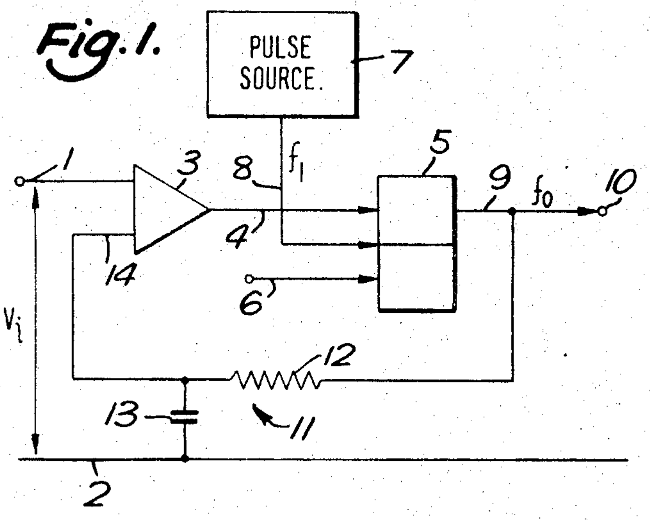
FIG. 1 illustrates a circuit embodying a relatively simple form of the invention.

A voltage $V_t$ which constitutes the aforementioned input signal appears between a line 1 and a reference or earth line 2 and is applied to one input of a difference amplifier 3. An output line 4 of the amplifier 3 carries the aforementioned first signal which is applied to one input of a JK bistable circuit 5. To the other input 6 of the bistable 5 is applied a continuous logical unity signal. A pulse source 7 provides a pulse train of frequency $f_1$ on a clock input line of the bistable 5.

The bistable 5 will change state on the arrival of each clock pulse on the line 8 provided that the said first signal on the line 4 is in a predetermined condition which in this case will be a positive (or logical "unity") state. Under the circumstances the output of the bistable 5 will be a pulse output on line 9, the pulse output having a frequency proportional to the frequency of the input pulse train. If the signal on the line 4 changes condition and becomes zero or negative and therefore, in respect of the bistable circuit 5, goes into a binary zero state, the output of the bistable circuit on the line 9 will switch to the zero state in response to the next clock pulse, if it is not already in that state, and will remain there despite the continuous provision of clock pulses on the line 8.

The output pulses on the line 9 may be fed to an output terminal 10 for transmission. Additionally the output pulses are fed to a means for developing a feedback signal. This means is constituted by a passive integrator 11 comprising a series resistor 12 and a shunt capacitor 13. The output of the integrator is fed to the other input 14 of the amplifier 3. The feedback signal will be proportional to the mean frequency of the output pulses on the line 9 and the output of the bistable 5 is accordingly a variable frequency which is adjusted by the amplifier 3 so as to maintain the voltage across the capacitor 13 just equal to the input voltage $V_t$.

Figure 2:
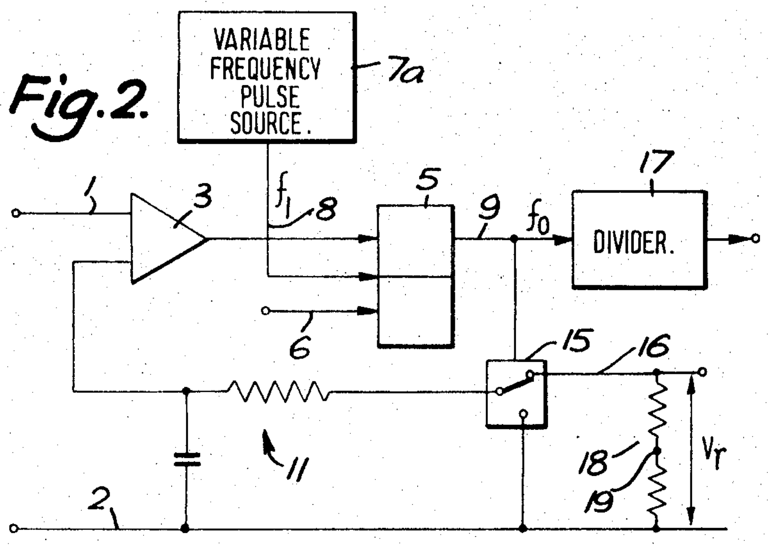
FIG. 2 illustrates a more complex form of the invention embodied by a circuit capable of acting as a multiplier.

FIG. 2 illustrates the circuit of FIG. 1 with several modifications. In the circuit of FIG. 2 the output pulses from the bistable circuit 5 operate a switch 15, which is conveniently an electronic switch but which is shown for convenience as a mechanical switch. The switch 15 is responsive to pulses on the line 9 to couple a reference voltage $V_r$ appearing between a line 16 and the line 2 to the integrator 11. At other times the switch couples the integrator to the earth or reference line 2.

Because the integrator is, in the circuit of FIG. 2, fed with pulses temporally corresponding to pulses appearing on the line 9 but of a magnitude depending on the reference voltage, the output frequency on the line 9 will be proportional to the input signal $V_t$ and inversely proportional to the reference voltage. Accordingly the reference voltage can be varied in order to alter the linear relationship between the output pulse frequency and the input signal.

In FIG. 2, instead of a pulse source 7 providing an input pulse train of constant frequency, there is provided a variable frequency pulse source 7*a*. It is readily possible to show that the pulse output frequency is also proportional to the frequency of the pulse train and accordingly it is proportional to the product of a variable represented by the input direct voltage and a variable represented by the frequency of the pulse train from the source 7*a*. Accordingly the circuit of FIG. 2 can be used as a multiplier for two variables which are provided in the form of a direct signal of multiple voltage and a pulse train.

It will be appreciated that the output frequency on the line 9 is of uneven form. Accordingly it may be inconvenient to transmit. For this purpose it is convenient to provide a divider 17 which divides the pulse output to a lower frequency which will be of more uniform mark-to-space ratio. For example, if the frequency $f_1$ is 400 kilohertz, then, considering variations only in the input direct signal, the pulse frequency on the line 9 will vary between zero and 200 kilohertz. The divider might be arranged to divide this frequency by a factor of 100 so as to provide an output frequency in the range zero to 2 kilohertz.

It may often be inconvenient to provide an output frequency which can vary down to zero frequency and accordingly, provided that the input voltage $V_t$ 'floats' with respect to the supply lines for the circuit of FIG. 2 a proportion of the reference voltage may be added to the input signal $V_t$. This can be conveniently achieved using a voltage divider 18 between the line 16 and line 2 feeding the input voltage between the line 1 and a point 19 on the divider 18.

Figure 3:
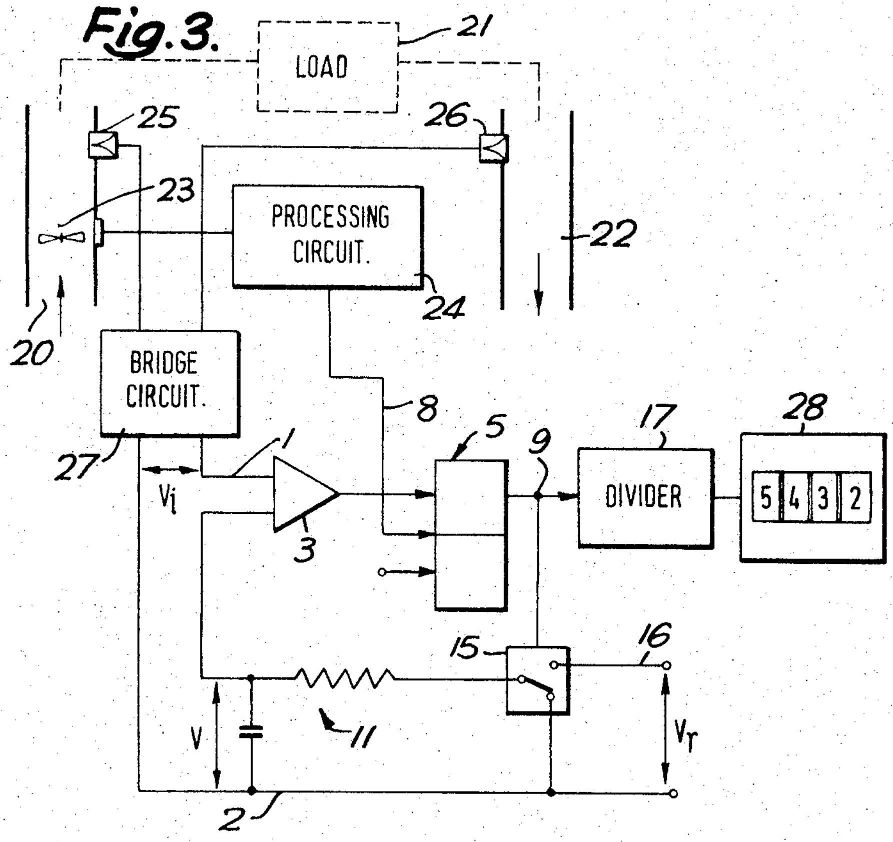
FIG. 3 illustrates schematically a heat meter embodying the invention.

FIG. 3 illustrates schematically a heat meter incorporating the circuit described with reference to FIG. 2. FIG. 3 also illustrates schematically the relevant parts of a heat exchanger whose operation is monitored by a heat meter. Hot water flows through an inlet pipe 20 and through a thermal load 21. Heat is given up to the thermal load and colder water flows out through an outlet pipe 22. The rate of flow of fluid through the thermal load is measured by a turbine 23 providing output pulses at a repetition frequency proportional to the speed of the turbine and accordingly proportional to the rate of flow of fluid through the inlet pipe 20. The pulses from the turbine 23 are fed through a processing circuit 24 and after any necessary shaping or conditioning therein are supplied as clock pulses on the line 8 to the bistable 5 arranged as described hereinbefore. The temperature in the inlet pipe 20 is measured by a sensor 25 whereas the temperature in the outlet pipe is measured by a sensor 26. The sensors 25 and 26 are coupled to a bridge circuit 27 or any convenient form of circuit arranged to provide a voltage proportional to the difference between the temperatures in the inlet and outlet pipes. This voltage is fed to the input of the amplifier 3.

The remainder of the circuit shown in FIG. 3 functions to provide on the output line 9 a pulse output proportional to the frequency of the pulses on the line 11 and proportional to the input direct voltage appearing between the lines 1 and 2. The output frequency on the line 9 is accordingly proportional to the product of the temperature difference represented by the output of the circuit 27 and the flow rate represented by the frequency of the pulse train on the line 8.

The output pulses on the line 9 are fed to a processing circuit which may comprise the divider 17 and after any necessary shaping and scaling are applied to a display counter 21. Because the rate of the pulse output corresponds to a rate of flow of heat the counter will indicate the total heat transferred from the liquid flowing through the load 3.

The turbine meter may be formed with a permanent magnet on a vane, the magnet operating a reed switch outside the pipe each time it passes the switch. The temperature sensors may comprise two resistance thermometers but could also comprise a multiple junction thermopile.

Figures 4, 6:
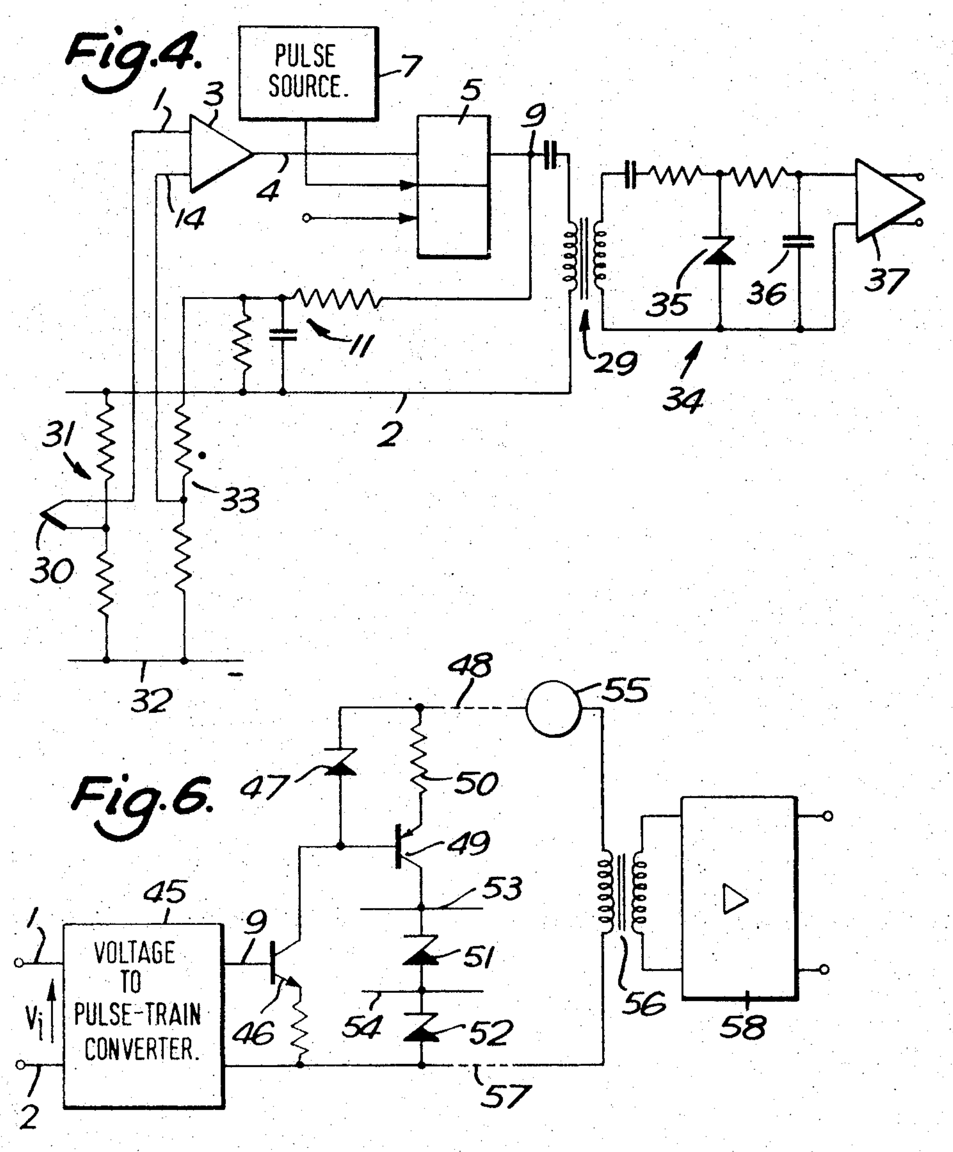
FIG. 4 illustrates schematically a transmitter for the output signal of a thermocouple.
FIG. 6 illustrates a system for transmitting information in pulse train form over a pair of wires.

FIG. 4 illustrates a circuit for transmitting a signal representing a temperature as measured by a thermocouple. The circuit includes the arrangement of FIG. 1. It is formed effectively by two parts, the first part extending to and including the primary of a transformer 29 coupled between the output line 9 and the line 2. The other part consists of a circuit coupled to the secondary of the transformer 29. The two parts of the circuit would preferably have separate power supplies or derive power from separate windings of a transformer coupled to supply mains.

A thermocouple 30, whose output is to be amplified, is connected to the first part of the circuit; one side of the thermocouple is connected to a junction point in a resistance bridge 31 coupled between the line 2 and a negative line 32. The other side of the thermocouple is coupled to the input of the difference amplifier 3. The second input of the differential amplifier is connected to the other side of the resistance bridge which includes a temperature sensitive resistor 33. The bridge is energized from a feed-back signal obtained from an integrator 11 energized in accord with the output pulses on the output line 9 of the bistable circuit 5. The sensitivity of the bridge 31 is arranged to provide cold junction compensation for the thermocouple 30. If the potential on the input line 1 to the amplifier 3 is more positive than that on the input line 14, a positive voltage appears on the output line 4 from the amplifier 3 and a pulse output will appear on the line 9 proportional to the frequency of clock pulses supplied to the bistable 5 from the pulse source 7. The output on the line 9 reverts to a zero state following the disappearance of the positive or unity state of the signal on the line 4.

Accordingly, so long as the potential on the line 1 is more positive than that on the line 14, the output on the line 9 is a square wave of unity mark-to-space ratio; the square wave is passed to the integrator or averaging circuit 11 of which the output is connected to the temperature sensitive resistor 33 in such a way as to tend to cause the potential on the line 14 to go more positive, so removing the initial potential difference between the lines 1 and 14.

In normal operation therefore, in the manner previously described with reference to FIG. 1, square pulses of defined amplitude and with a width equal to the interval between the clock pulses from the source 7 will appear at the input to the averaging circuit 11 with a frequency which is just sufficient to maintain the voltages of lines 1 and 14 equal. The information in this wave form is contained in the proportion of time for which the positive output is available and accordingly it is possible to transform or couple this wave form using the transformer 29 into the second circuit 34 where the amplitude of the wave form, which may have suffered deterioration as a result of the characteristics of the transformer 29 and other components, may be re-established using a Zener diode 35. The resultant reformed signal would be fed to a further averaging circuit 36 and amplified by an amplifier 37 or processed according to requirements.

It will be observed that the output from the second circuit 34 is completely isolated electrically from the thermocouple 30 as a result of the separation of the power supplies for the circuits coupled to the primary winding and the secondary winding of the transformer 29.

If no cold junction compensation were required because an actual cold junction was used or because the signal representing a temperature was derived from the source other than a thermocouple, the bridge 32 would be unnecessary and the voltage provided by the source would be compared directly with the voltage from the circuit 11 by the difference amplifier 3.

It will be appreciated that capacitative coupling between the output line 9 and the circuit 34 could be used in place of the inductive coupling provided by the transformer 29. Alternatively, an opto electronic coupling may be provided by a lamp and a photocell. It will also be appreciated that the circuit shown in FIG. 4 would be capable of operating with a resistance thermometer of other variable resistance devices the sensing instrument; for this modification the thermocouple 30 can be replaced by a short circuit and the variable resistor 33 becomes the variable resistance device sensing temperature. The input to the amplifier 3 is then an out of balance voltage from the bridge 32 which is energized from the integrator 11.

Figure 5:
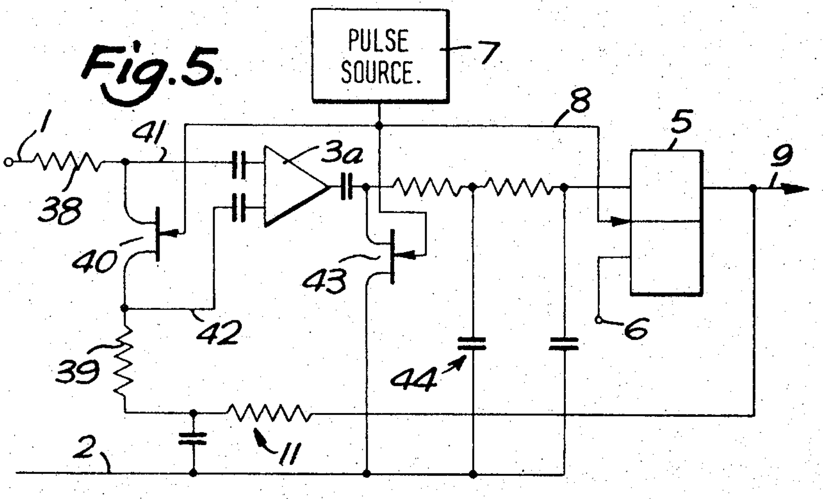
FIG. 5 illustrates a circuit incorporating an alternating current amplifier.

In the circuit of FIG. 4 the differential amplifier could be a chopper amplifier to reduce "drift." The provision of a chopper amplifier normally has the disadvantage that it requires an additional oscillator. However, it is quite feasible to use the pulse source 7, which will normally include an oscillator, for both the purpose described with reference to FIG. 1 and to provide appropriate wave forms for operating a chopper amplifier. FIG. 5 shows a development of this concept. For simplicity the circuit of FIG. 5 merely shows the conversion of an input voltage appearing between the lines 1 and 2 into an output pulse train appearing on an output line 9 of a bistable 5; however the circuit of FIG. 5 could obviously be used in place of the corresponding parts of the circuits shown in FIGS. 2, 3 or 4.

In the circuit of FIG. 5 the input voltage appearing between the lines 1 and 2 and the output voltage of the passive integrator 11 are fed through resistors 38 and 39 respectively to lines 41 and 42 which are coupled by capacitors to an alternating current amplifier 3*a*. A field effect transistor switch 40 is coupled between the lines 41 and 42. The transistor 40 is switched by pulses from the pulse source 7. In this manner the difference between the input voltage and the feed back voltage is chopped by the transistor switch 4 and the resulting alternating wave form is amplified by the amplifier 3*a*. The output of the amplifier which is at a high level is phase-sensitively demodulated by a further field effect transistor switch 43 which is driven by pulses from the same pulse source 7 that drives the switch 40. The resultant square wave is passed through a low pass filter network 44 to one input of the bistable 5 which operates in the manner previously described to switch repetitively when a positive voltage is fed to it from the network 44. The effect of the filter 44 is to delay the pulse wave form obtained from the switch 43 so that in effect the clock pulses on the line 8 arrive at such a time that the bistable 5 responds to the output condition of the amplifier 3*a* that existed immediately before the arrival of the clock pulse. An obvious alternative to the filter 44 consists of a delay circuit between the pulse source 7 and the clock input of the bistable 5. The purpose of these alternative means is to ensure that the various transients introduced by the chopping process have died away before the output voltage from the amplifier 3*a* is sampled by the bistable 5.

FIG. 6 illustrates schematically a circuit suitable for the transmission of information in pulse train form over a pair of wires. In this example an input voltage $V_i$ appearing between lines 1 and 2 leads fed to a voltage-to-pulse train converter 45 which may take the form described with reference to any of the preceding Figures. The pulse output of the converter appears on a line 9. This pulse output produces an impulsive current in the collector circuit of a transistor 46 of which the base is coupled to the line 9. This impulsive current is coupled by a Zener diode 47 to a line 48. The Zener diode 47 together with a transistor 49 and a resistor 50 constitute a high impedance source of current through Zener diodes 51 and 52 in series. By this means the voltages on supply lines 53 and 54 which are coupled, in the former case between the collector of transistor 49 and the Zener diode 51 and in the latter case between the Zener diodes 51 and 52. The supply lines would normally be used to provide supply voltages for the voltage to pulse train converter 45. Power for the circuit is supplied by a low impedance direct current supply 55.

The impulsive current derived from the pulses on the line 9 flows in the line 48 and accordingly in the primary winding of a transformer 56 coupled between the source 55 and a line 57 coupled to the Zener diode 52. The output from the secondary of the transformer 56 may be amplified in an amplifier 58 which as far as direct current is concerned is fully isolated from the converter 45.

I claim:

1. A signal processing circuit comprising means responsive to an input signal and a feedback signal to produce a first signal varying in accord with the difference between input and feedback signals, a pulse source providing a continuous train of pulses, a bistable device having set, reset and pulse input lines and which can be changed in state by set and reset signals only in response to a pulse on said pulse input line, means applying said continuous train of pulses to said pulse input line, means applying a logic reset signal to said reset input line, means applying said first signal to said set input line whereby the bistable device changes in state repetitively to produce a repetitive pulse output signal with a frequency proportional to the repetition frequency of the continuous train of pulses when the first signal is in a predetermined condition and means coupled to said bistable device for developing said feedback signal in accord with the mean frequency of the output pulse signal.

2. A circuit as claimed in claim 1 in which the means for developing the feedback signal comprises integrating means.

3. A circuit as claimed in claim 2 in which the integrating means comprises a passive integrator.

4. A circuit as claimed in claim 2 in which the integrating means is arranged to receive the pulses constituting the pulse output signal.

5. A circuit as claimed in claim 2 in which the means for developing the feedback signal comprises switch means for applying a reference signal to the integrating means at times temporally corresponding to the pulses of the pulse output signal.

6. A circuit as claimed in claim 5 in which the switch means comprises a switch for temporarily closing to apply the reference signal to the integrating means in response to each pulse of the said pulse output signal.

7. A circuit as claimed in claim 6 in which means are provided for varying the reference signal and thereby raising or lowering the pulse output frequency for an input signal of given magnitude.

8. A signal processing circuit comprising a difference amplifier for receiving an input signal and a feedback signal and for producing a first signal varying in accord with the difference between the input and feedback signals, a pulse signal source providing a continuous train of input pulses, a logic circuit response to the said first signal and to said train of input pulses for producing when said first signal is in a predetermined condition a repetitive output pulse signal, means including integrating means for developing the feedback signal in accord with the mean frequency of the output pulse signal; said logic circuit including a bistable device which can be changed in state only in response to a pulse in the input pulse train and which is adapted to switch repeatedly between states in response to pulses in the input train only if the said first signal is in the said predetermined condition.

9. A circuit as claimed in claim 8 in which the said difference amplifier is a chopper amplifier operated at a frequency corresponding to the pulses of the said input pulse train.

10. A circuit as claimed in claim 8 in which the difference amplifier is an alternating current amplifier and switching means are provided for interrupting the feeding of the input signal and the feedback signal to respective inputs of the alternating current amplifier.

11. A circuit as claimed in claim 10 in which the switching means comprise a switch operable by pulses from a pulse source arranged to provide the pulses of the said input pulse train.

12. A meter comprising means responsive to a first variable to provide an input signal of magnitude proportional to the first variable, means responsive to a second variable for producing a pulse train of repetition frequency proportional to the second variable, means responsive to the input signal and a feedback signal to produce a first signal varying in accord with the difference between the input and feedback signals, a logic circuit responsive to the said first signal for producing when said first signal is in a predetermined condition a repetitive output pulse signal, said logic circuit comprising a bistable device arranged to change state only in response to a pulse in said pulse train and to switch repeatedly between states only when said first signal is in the said predetermined condition, means including integrating means for developing said feedback signal in accord with the mean frequency of the output pulse signal and indicating means responsive to the said output pulse signal.

13. A signal processing circuit comprising a difference amplifier having means for receiving an input signal and a feedback signal and means for adding a reference signal to one of said input and feedback signals, said difference amplifier producing a first signal varying in accord with the difference between the input and feedback signals as modified by the addition of said reference signal, a logic circuit responsive to said first signal for producing when said first signal is in a predetermined condition a repetitive output pulse signal, means including integrating means for developing the feedback signal in accord with the mean frequency of the output pulse signal, and means for providing an input pulse train; said logic circuit including a bistable device which can be changed in state only in response to a pulse in the input pulse train and which is adapted to switch repeatedly between states only if the said first signal is in the said predetermined condition.

14. A signal processing circuit comprising means responsive to an input signal and a feedback signal to produce a first signal varying in accord with the difference between the input and feedback signals, means responsive to the said first signal for producing when said first signal is in a predetermined condition a repetitive output pulse signal, and means for developing the feedback signal in accord with the mean frequency of the output pulse signal and means for dividing the frequency of the said repetitive output pulse signal.

15. A meter as claimed in claim 14, further comprising a counter arranged for counting the pulse output.

16. A meter comprising a temperature measuring bridge responsive to a temperature to provide an input signal of magnitude proportional to said temperature, means responsive to the rate of flow of a fluid for producing a pulse train of repetition frequency proportional to the rate of flow, means responsive to the input signal and a feedback signal to produce a first signal varying in accord with the difference between the input and feedback signals, a logic circuit responsive to the said first signal for producing when said first signal is in a predetermined condition a repetitive output pulse signal, said logic circuit comprising a bistable device arranged to change state only in response to a pulse in said pulse train and to switch repeatedly between states only when said first signal is in the said predetermined condition, means including integrating means for developing said feedback signal in accord with the mean frequency of the output pulse signal and indicating means responsive to the said output pulse signal.

* * * * *